United States Patent [19]

Masel et al.

[11] Patent Number: 5,181,455
[45] Date of Patent: Jan. 26, 1993

[54] ELECTRIC GRILLING APPLIANCE

[75] Inventors: Ruben Masel, Ramat Hasharon; George Valdshtein, Givat Savyon, both of Israel

[73] Assignee: Talbert Ltd., Tel-Aviv, Israel

[21] Appl. No.: 803,939

[22] Filed: Dec. 9, 1991

[30] Foreign Application Priority Data

Dec. 14, 1990 [IL] Israel .................................. 96665
Jun. 4, 1991 [IL] Israel .................................. 98359

[51] Int. Cl.⁵ .............................................. A47J 37/08
[52] U.S. Cl. ....................................... 99/391; 99/389; 99/401; 99/447; 99/451; 219/405; 219/411; 219/486; 219/521
[58] Field of Search ......................... 99/349, 388-393, 99/426, 427, 446, 447, 451, 401, DIG. 14; 219/405, 521, 411, 401, 486; 426/523

[56] References Cited

U.S. PATENT DOCUMENTS

| Re. 24,296 | 3/1957 | Stewart ............................... 99/447 |
| 1,480,084 | 1/1924 | Lamb. |
| 1,541,011 | 6/1925 | Vallos ................................. 99/392 |
| 1,596,081 | 8/1926 | Coleman. |
| 1,832,831 | 11/1931 | Ginder ................................. 99/391 |
| 1,896,537 | 2/1933 | Bonaccorsi ......................... 99/392 |
| 1,948,739 | 2/1934 | Wilcott et al. . |
| 2,739,525 | 3/1956 | Giambertoni . |
| 3,154,005 | 10/1964 | Roeks et al. . |
| 3,304,406 | 2/1967 | King ................................... 219/411 |
| 3,636,858 | 1/1972 | Paaskesen . |
| 3,742,838 | 7/1973 | Luschen et al. .................... 99/389 |
| 3,789,749 | 2/1974 | Paaskesen . |
| 3,986,444 | 10/1976 | Caudron . |
| 4,290,349 | 9/1981 | Fiorenza ............................. 99/391 |
| 4,406,218 | 9/1983 | Hatakeyama ...................... 99/447 |
| 4,441,015 | 4/1984 | Eichelberger et al. ........... 219/411 |
| 4,491,066 | 1/1985 | Juriga et al. . |
| 4,581,520 | 4/1986 | Vu et al. .......................... 219/405 |
| 4,718,332 | 1/1988 | Mothrath ........................... 99/385 |
| 4,731,251 | 3/1988 | Jovanovic . |
| 4,791,862 | 12/1988 | Hoffmann . |
| 4,972,768 | 11/1990 | Basora San Juan . |

FOREIGN PATENT DOCUMENTS

3322236 1/1985 Fed. Rep. of Germany ...... 219/411

Primary Examiner—Timothy F. Simone
Attorney, Agent, or Firm—Benjamin J. Barish

[57] ABSTRACT

An electric grilling appliance includes a pair of infrared radiation emitting heaters disposed within a housing on opposite sides of a food holder. The food holder includes a pair of metal food holder plates of a size and configuration to directly contact, on their inner surfaces, substantially the complete outer surface of the food article to be grilled. The outer surfaces of the metal food holder plates are blackened to absorb the infrared radiation emitted by the heaters. Springs urging the metal food holder plates towards each other into firm contact with the food article to be grilled.

9 Claims, 6 Drawing Sheets

ELECTRIC GRILLING APPLIANCE

FIELD AND BACKGROUND OF THE INVENTION

The present invention relates to an electric grilling appliance, and particularly to one which may be used for grilling food articles, such as steak, hamburger, and the like, in an extremely short time.

A large number of electric grilling appliances are known and many are described in the patent literature, for example in U.S. Pat. Nos. 3,906,849,; 2,025,893; 1,896,537; 1,832,831; and 1,541,011. As a rule, the known grilling appliances include open grills, racks or meshes, for holding the food article to be grilled. However, such grilling appliances usually require about 5-8 minutes or more to grill a steak or hamburger. In addition, the known grilling appliances generally suffer from a number of other disadvantages, including production of smoke, difficulty to clean, splashing of drippings, and bulkiness, all of which make the use of such appliances inconvenient in today's small modern kitchens.

OBJECTS AND BRIEF SUMMARY OF THE INVENTION

An object of the present invention is to provide an electric grilling appliance having advantages in one or more of the above respects, and particularly in substantially reducing the time required to grill a food article, such as a steak, a hamburger, or the like.

According to the present invention there is provided an electric grilling appliance, comprising a housing; a pair of infrared radiation emitting heaters disposed within the housing on opposite sides thereof; and a food holder disposed within the housing between, and spaced from, the pair of infrared radiation emitting heaters for holding the food article to be grilled. The food holder includes a pair of metal food holder plates of a size and configuration to directly contact, on their inner surfaces, substantially the complete outer surface of the food article to be grilled, the outer surfaces of the metal food holder plates being blackened to absorb the infrared radiation emitted by the heaters. The appliance further includes spring means for urging the metal food holder plates towards each other into firm contact with the food article to be grilled.

An electric grilling appliance constructed in accordance with the foregoing features thus exploits the following two phenemona: (1) The thermoconductivity in protein food (particularly meat) increases from 8 to 12 times when the meat is heated on both sides under controlled pressure; and (2) by applying the heat in the form of infrared radiation directed to a blackened surface of a metal plate, the radiation is immediately converted to heat by conduction and is immediately applied to the food article in contact with the metal plate. As a result, it was found that grilling steak, hamburger or the like, which usually takes about 5-8 minutes in a conventional grill, takes only about 45-150 seconds when grilled by the electric appliance constructed in accordance with the present invention. In addition, although the grilling time is very short, the appliance produces a browned grilled surface; and because the grilling time is very short, the steak, hamburger or the like produced is very juicy and rich in nutritional value.

In the preferred embodiments of the invention described below, the infrared radiation emitting heaters are halogen lamps.

Further features and advantages of the invention will be apparent from the description below.

BRIEF DESCRIPTION OF THE DRAWINGS

The invention is herein described, by way of example only, with reference to the accompanying drawings, wheein.

DESCRIPTION OF PREFERRED EMBODIMENTS

Figure 1:
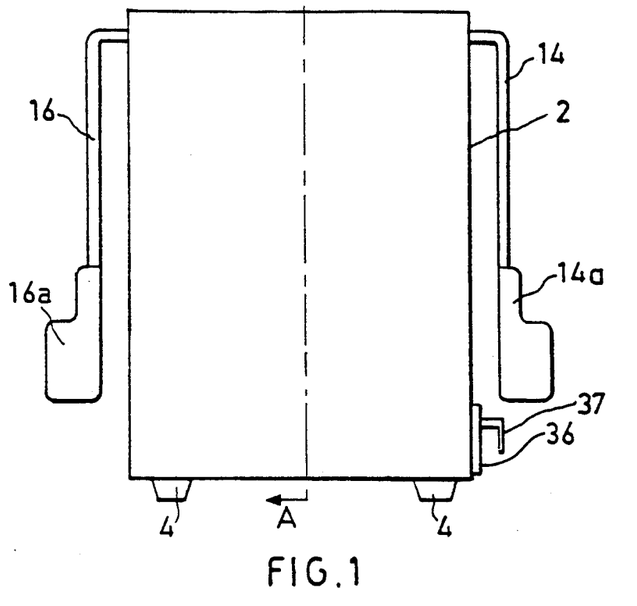
FIG. 1 is an end view illustrating one form of electric grilling appliance constructed in accordance wih the present invention.
Figure 1A:
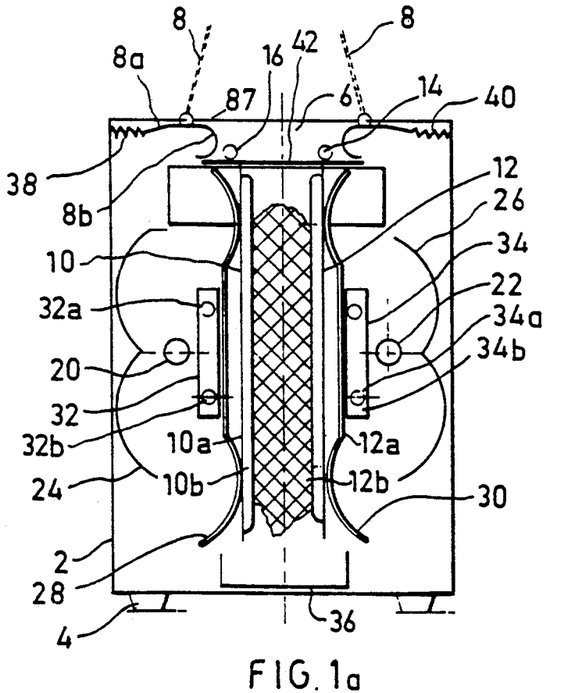
FIG. 1a is a sectional view along line A—A of FIG. 1.

The Embodiment of FIGS. 1 and 1

The grilling appliance illustrated in FIGS. 1 and 1a comprises a housing 2 including rubber feet 4 at the four corners of its bottom wall for supporting the housing in a vertical position on a flat horizontal surface. The top wall of the housing is formed with an inlet opening 6 to provide access into the interior of the housing when a pair of pivotally mounted lids 8 on the opposite sides of the inlet opening are pivotted to their open positions as shown in broken lines in FIG. 1a.

The food article, e.g., a steak, hamburger or like, to be grilled is held by a pair of metal food holder plates 10, 12 insertable through the inlet opening 6 of the housing. Each of the metal plates 10, 12 is supported centrally of a bail member 14, 16, secured to the upper end of the respective metal plate. Each bail member 14, 16 extends for the complete width of the respective metal plate and terminates at its two outer ends in a pair of thermally-insulated handles 14a, 16a (FIG. 1) adapted to be grasped by the user when inserting or removing the food holder plates 10, 12 with the food article.

The metal food holder plates 10, 12 are of a size and configuration to directly contact, on their inner surfaces, substantially the complete outer surface of the food article to be grilled. Preferably, the metal plates 10, 12 are of rectangular configuration and of a size at least as large as the largest food article (e.g., steak, hamburger, etc.) to be grilled in the appliance.

These plates are of thin metal sheets, such as stainless steel or aluminium, so as to provide some degree of flexibility and thereby to enable them to conform to the outer surface of the food article.

The outer face of each metal sheet is blackened as indicated at 10a, 12a, in FIG. 1a, and the inner face is provided with a non-stick coating, such as "Teflon" (Reg.T.M.), as indicated at 10b, 12b, in FIG. 1a.

A pair of halogen lamps 20, 22 are disposed within housing 2 on opposite sides of the metal food holder plates 10, 12. The halogen lamps emit intense infrared radiation towards the metal plates 10, 12. This radiation is absorbed by the blackened outer surfaces 10a, 12a of the metal plates and is converted to heat, which heat is transmitted by conduction directly to the surfaces of the food article contacted by the plates. A pair of parabolic reflector plates 24, 26 extend along the outer sides of the halogen lamps 20, 22 and reflect the infrared radiation emitted by these lamps substantially uniformly over the blackened outer surfaces 10a, 12a of the metal food holder plates 10, 12.

The illustrated appliance further includes a pair of leaf springs 28, 30, bearing against the opposite ends of each of the metal plates 10, 12, for urging the metal plates towards each other, and thereby to press them into firm contact with the food article. Springs 28, 30 are mounted within housing 2 by mounting members 32, 34, via fasteners 32a, 34a, receivable within slotted openings 32b, 34b, in the mounting members to permit varying the pressure applied by the springs against the metal food holder plates 10, 12. The illustrated bowed configuration of the springs 28, 30, permits the metal food holder plates 10, 12, with the food article in between, to be inserted via the housing inlet opening 6 into engagement with the springs.

The housing 2 further includes a liquid drippings collector 36 underlying the metal food holder plates 10, 12, to catch any drippings from the food article during its grilling. Collector 36 includes a handle 37 to facilitate its removable via an opening in the end wall of the housing 2, as shown particularly in FIG. 1.

The pivotal lids 8 covering the inlet opening 6 of the housing are normally urged to an open position (shown in broken lines in FIG. 1a) by a pair of springs 38, 40, engageable with outer extensions 8a of the two lids 8. When the two metal food holder plates 8, 10 are inserted through the inlet opening 6, their bail arms 14, 16 engage a platform 42 underlying the inlet opening, and move the platform downwardly. Platform 42 is fixed to outer extensions 8b of the two lids 8, such that this downward movement of the platform by the bail arms 14 pivots the two lids to their closed positions.

It will thus be seen that when a food article, such as a steak or hamburger, is to be grilled, the two food holder plates 10, 12 are removed from the appliance, and the food article is placed between them, with the food article in contact with the non-stick coating of each plate, and with the blackened surface of each plate facing outwardly. The two pairs of handles 14a, 16a of the two plates are then grasped, with the food aricle between the two plates, and the two plates are inserted via the normally-open lids 8 into the inlet 6 at the upper end of the housing. As the insertion of the food holder plates with the food article is completed, the bails 14, 16 at the upper ends of the food holder plates engage the platform 42 underlying opening 6, and move the platform downwardly, thereby pivotting the lids 8 to their closed positions closing opening 16. The food holder plates are retained in this position within housing 2, and with the lids 8 closed, by the frictional engagement of the bowed springs 28, 30 with the outer surfaces of the food holder plates. These springs also serve to press the food holder plates towards each other and into firm contact under pressure with the food article.

When the halogen lamps 20, 22 are energized, the infrared radiation is uniformly distributed over the blackened outer surfaces 10a, 12a of the food holder plates 10, 12, which blackened surfaces immediately convert the radiation into heat. This heat is transmitted by conduction through the metal food holder plates 10, 12, directly to the food article in contact with the inner surfaces of these metal plates, to quickly grill the food article.

As indicated earlier, it has been found that because of the high thermoconductivity of protein food (particularly meat) heated on both sides under controlled pressure, and because of the instantaneous conversion of the infrared radiation into heat by the blackened surface of the metal food holder plates and the transmission of this heat to the food article by conduction, the grilling time of food articles, such as steaks, hamburgers and the like, can be reduced very substantially, e.g., from about 5-8 minutes usually required in a conventional appliance, to about 45-150 seconds in the illustrated appliance. Moreover, even though the grilling time is very short, a brown grilled surface is produced: and because the grilling time is very short much of the juice and nutritional value of the food product is retained.

Figure 2:
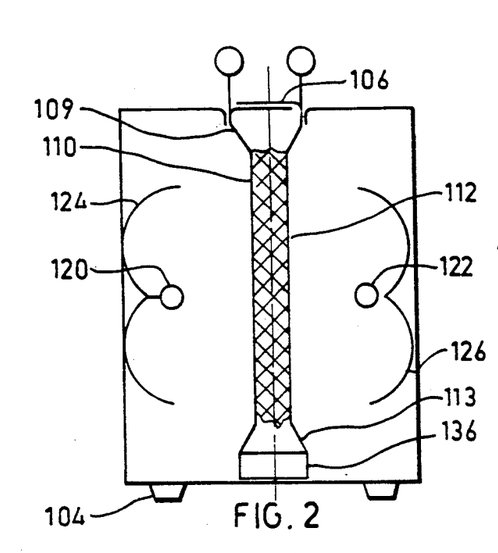
FIG. 2 is a top plan view illustrating a second form of electric grilling appliance constructed in accordance with the present invention.
Figure 2A:
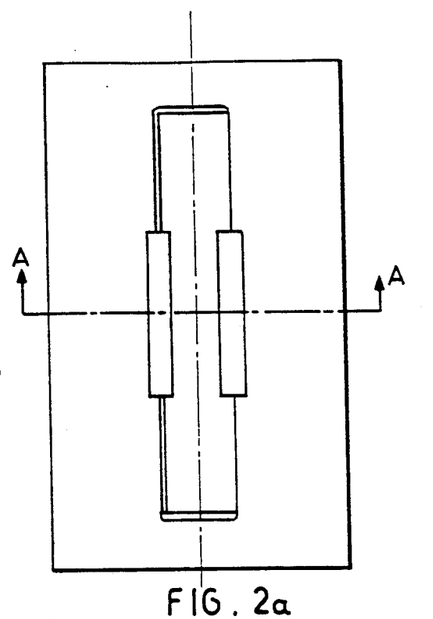
FIG. 2a is a sectional view along line A—A of FIG. 2.
Figure 2B:
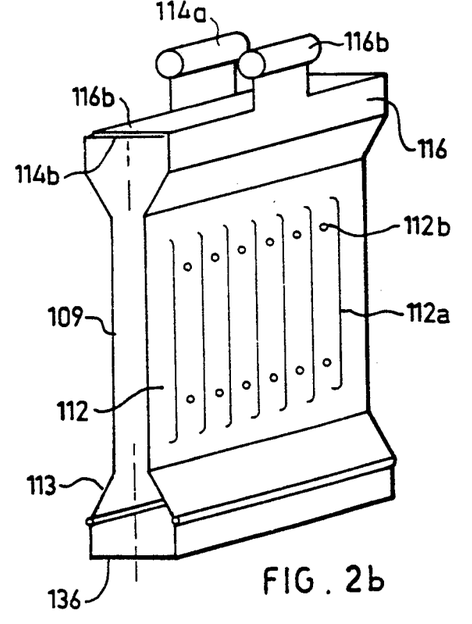
FIG. 2b is a three-dimensional view illustrating the food holder in the appliance of FIG. 2.

The Embodiment of FIGS. 2, 2a, 2b

The grilling appliance illustrated in FIGS. 2 and 2a includes a somewhat simpler construction but provides all the foregoing advantages of the appliance of FIGS. 1 and 1a. In the construction of FIGS. 2, 2a, the food article to be grilled is held in a unitary food holder 109, including the two metal plates 110, 112, corresponding to plates 10 and 12 in FIGS. 1, 1a, to facilitate the insertion of the food article to be grilled into the appliance, and its removal from the appliance. Food holder 109 is more particularly illustrated in FIG. 2b.

Thus, the appliance in FIGS. 2 and 2a also includes a housing 102 supported on rubber feet 104 at its four corners, and having an inlet opening 106 at its upper end for the insertion and removal of the food article between the pair of metal plates 110, 112 of the food holder 209. The two metal food holder plates 110, 112 are joined together at their lower ends by a U-shaped extension 113 so as to form a unitary food holder, as illustrated in FIG. 2b, insertable into and removable from the housing 102 with the food article. The extension 113 at the bottom of the food holder 109, including the food dripping collector 136, may all be constructed of a single piece of elastic metal sheet material, e.g., stainless steel or aluminium, such that the elasticity of the sheet material serves as the spring means for uging the metal plates 110, 112 towards each other into firm contact with the food article to be grilled.

The two metal food holder plates 110, 112 are similarly constructed as food holder plates 10 and 12, with outer blackened surfaces and inner surfaces provided with a non-stick coating. They are also made of thin metal sheets, such as stainless steel or aluminium, to provide some degree of flexibility, and are of a size and configuration to directly contact, on their inner surfaces, substantially the complete outer surfaces of the food article to be grilled.

In addition, the plates 110, 112 are preferably formed with a plurality of vertically-extending ribs 112a projecting in the outward direction, and a plurality of circular dimples 112b projecting in the inward direction. Ribs 112a serve to strengthen the plates thereby enabling thinner plates to be used and extend in the outward direction so as not to significantly reduce the surface area of direct contact between the inner surfaces of the metal plates and the outer surfaces of the food article to be grilled, particularly when the food article is initially frozen. The circular dimples 112b extend in the inward direction to more firmly engage the food article between the plates.

It will be appreciated that the metal food holder plates 10 and 12 in the FIGS. 1 and 1a embodiment, may be similarly constructed with the ribs 112a and the dimples 112b.

The upper ends of the food holder plates 110, 112 are provided with extensions 114, 116, respectively, carrying thermally-insulated handles 114a, 116a, permitting the food holder to be inserted into and removed from the inlet 106 of the housing 102. The upper extensions 114, 116 of the food holder include inwardly-bent sections 114b, 116b carrying the two handles 114a, 116a and overlapping each other to serve as lids for closing opening 116 when the food holder is inserted into the housing.

The lower section 113 of the food holder 109 is formed with a receptacle 136 serving as the collector for liquid drippings from the food article being grilled. This collector is thus simultaneously insertable with the food holder into the housing, and is simultaneously removed with the removal of the food holder for cleaning purposes.

In all other respects, the appliance illustrated in FIGS. 2, 2a and 2b is constructed and operates in the same manner as described above with respect to FIGS. 1 and 1a. Thus, this appliance also includes the two halogen lamps 120, 122 on opposite sides of the food holder 109, and the reflector plates 124, 126 for evenly distributing the infrared radiation emitted from the halogen lamps over the blackened surfaces of the metal plates 110, 112 of the food holder 109.

Figure 3:
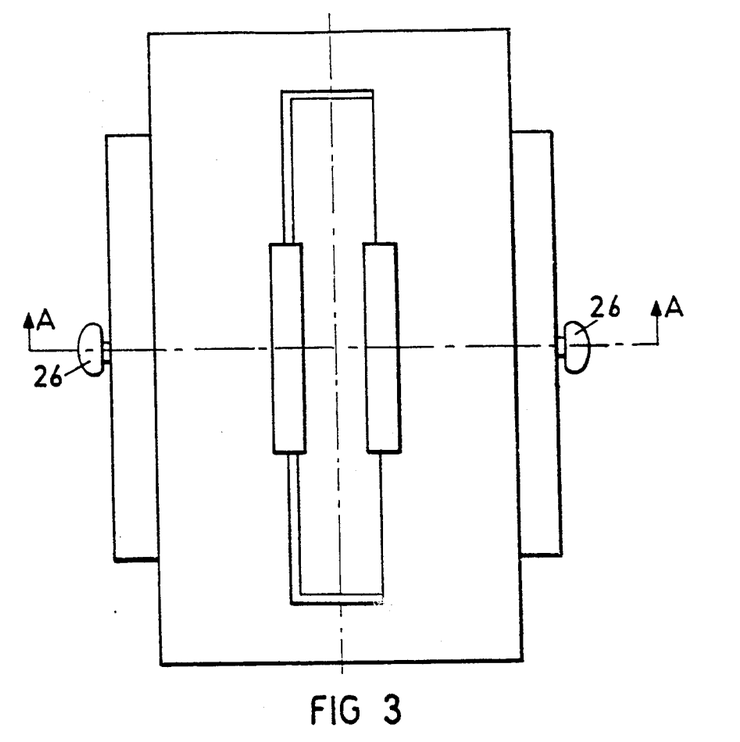
FIG. 3 is a top plan view illustrating a third form of grilling appliance constructed in accordance with the present invention.
Figure 3A:
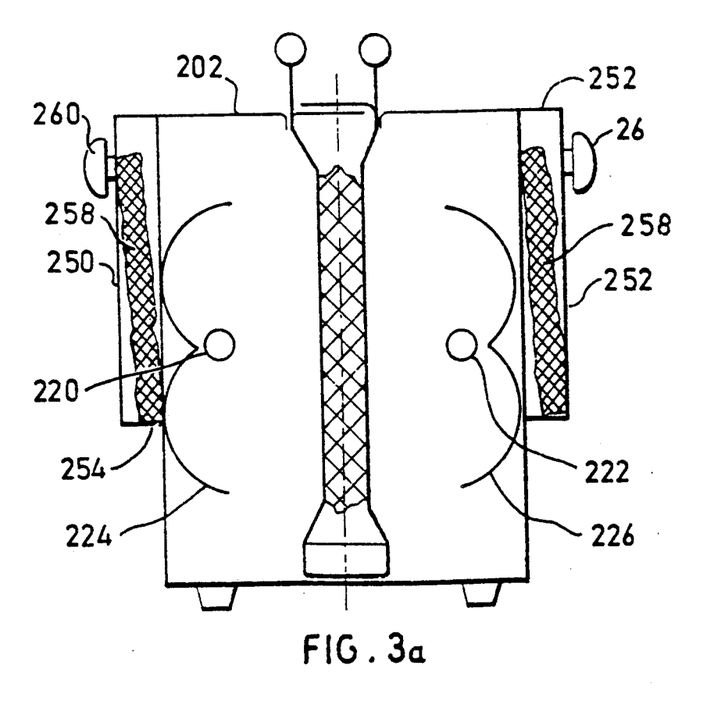
FIG. 3a is a sectional view along line A—A of FIG. 3.
Figure 4:
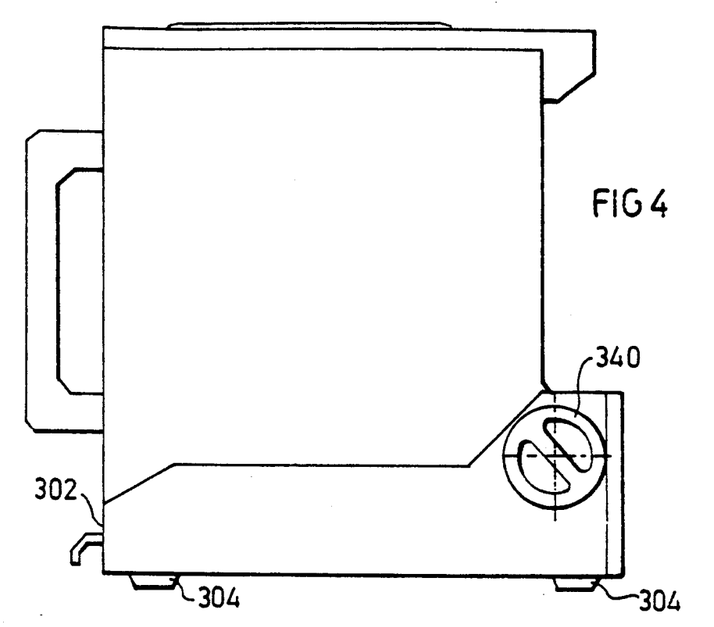
FIG. 4 is a side elevational view illustrating another form of electric grilling appliance constructed in accordance with the invention.

The Embodiment of FIGS. 3 and 3a

The appliance illustrated in FIGS. 3 and 3a is basically the same as that described above with respect to FIGS. 2, 2a and 2b, except that in this case the housing 202 is provided with a pair of side sections 250, 252, hinged to the side walls as shown at 254, 256 in order to define two side compartments 258, 260 for preheating bread slices or the like. Each of the side sections 250, 252 is provided with a handle 262, 264, enabling each side compartment to be open for insertion and removal of the bread. In addition, each section is formed with air circulation openings 250a, 252a, to permit the free circulation of air into the compartment and out to the atmosphere.

In all other respects, the appliance illustrated in FIGS. 3 and 3a is the same, and operates in the same manner, the appliance described above with respect to FIGS. 2, 2a and 2b, including the same food holder 209 for holding the food to be grilled, halogen lamps 220, 222 for emitting infrared radiation which is converted by the blackened surfaces of the food holder to heat, and the reflector plates 224, 226 which uniformly distribute the radiation from the lamps over the blackened surfaces of the food holder plates.

The Embodiment of FIGS. 4-9

The grilling appliance illustrated in FIGS. 4-9 comprises a housing 302 including rubber feet 304 at the four corners of its bottom wall. In this case, the end wall of the housing is formed with an elongated opening 306 (FIG. 5) for receiving the food holder, generally designated 308, adapted to hold the food article, e.g., steak or hamburger, to be grilled. The food holder 308 includes a pair of metal food holder plates 310, 312, adapted to be inserted, with the food article between them, through opening 306 into the housing.

Figure 5:
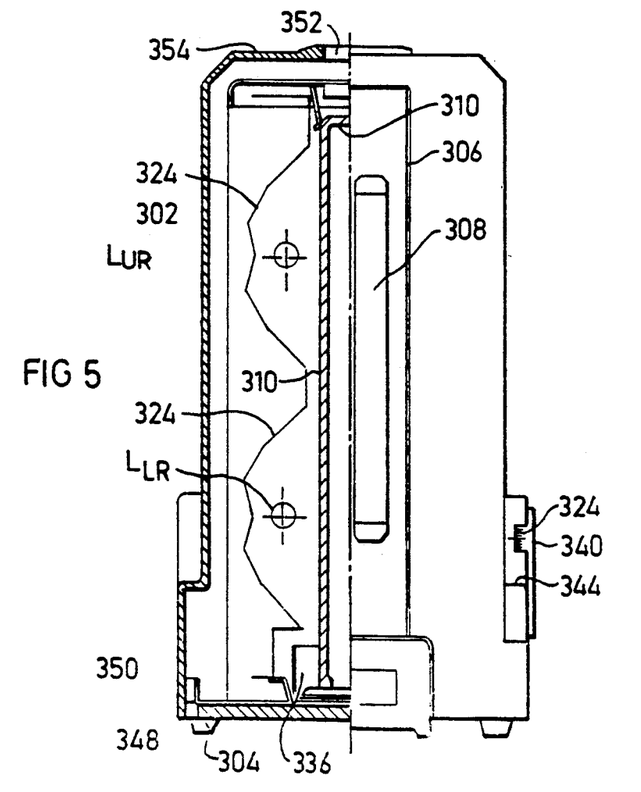
FIG. 5 is an end view, partly in section, of the electric grilling appliance of FIG. 4.
Figure 6:
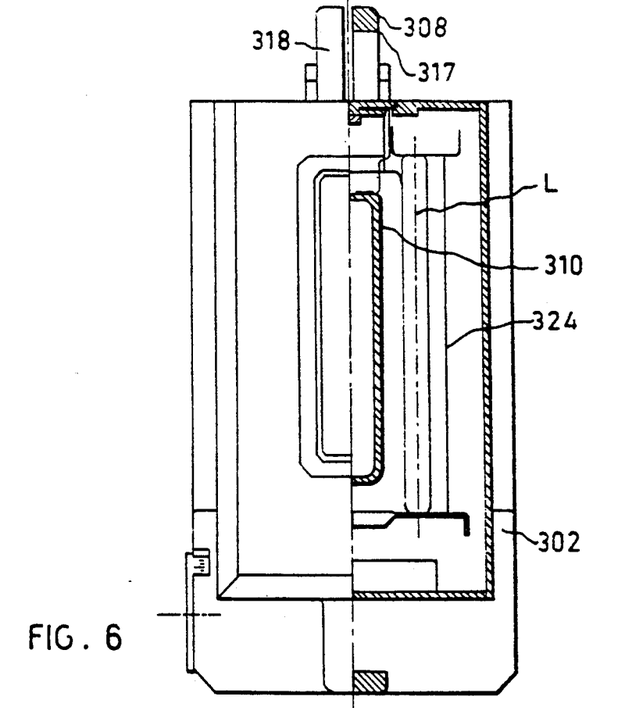
FIG. 6 is a top view, partly in section, of the electric grilling appliance of FIG. 4.
Figure 9:
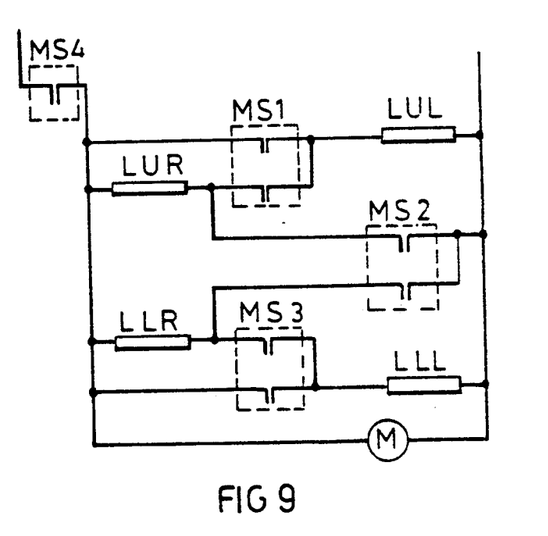
FIGS. 9 and 10 are schematical diagrams of two electric circuits for controlling the heaters in the described grilling appliance.

The heating means disposed within the housing 302 comprises two pairs of infrared radiation emitting heaters, namely an upper pair of lamps on the opposite sides of the housing, and a lower pair of lamps on the opposite sides of the housing. FIG. 5 illustrates only one lamp of each pair, i.e., the upper right lamp $L_{UR}$ and the lower right lamp $L_{LR}$. FIG. 9, however, illustrates all four lamps, namely the above two on the right side of the housing, the upper left lamp $L_{UL}$, and the lower left lamp $L_{LL}$, on the left side of the housing.

As also shown in FIG. 9, the two pairs of lamps are controlled by a cyclical switching means, including a synchronous motor M, and three switches $MS_1$, $MS_2$ and $MS_3$. The switches are cyclically controlled by the motor M so as to connect the two upper lamps $L_{UR}$, $L_{UL}$ in series and the two lower lamps $L_{LR}$, $L_{LL}$ in parallel during a first part of each cycle, and the two upper lamps $L_{UR}$, $L_{UL}$ in parallel and the two lower lamps $L_{LR}$, $L_{LL}$ in series during a second part of each cycle. The illustrated circuit includes a further switch $MS_4$, which acts as a timer switch.

The two pairs of lamps are halogen lamp which emit intense infrared radiation towards the metal plates 310, 312 of the food holder 308. This radiation is absorbed by the blackened outer surfaces of the metal plates, and is converted to heat, which heat is transmitted by conduction directly to the surfaces of the food article contacted by the plates. A pair of reflectors, e.g., 324 (FIG. 5), extend along the outer sides of the halogen lamps and reflect the infrared radiation emitted by them substantially uniformly over the blackened outer surfaces of the metal food holder plates 310, 312.

Figure 7:
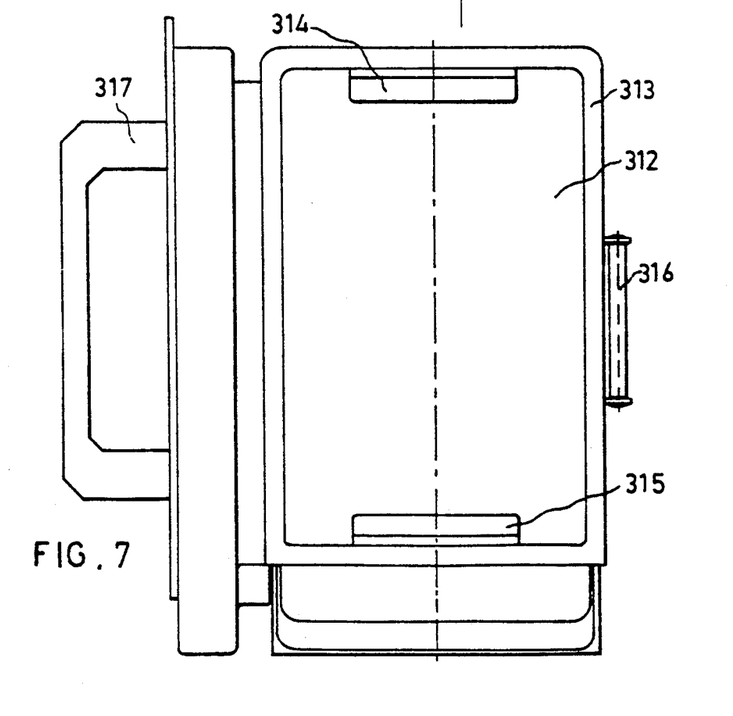
FIG. 7 is a side view of the food holder in the grilling appliance of FIGS. 4-6.
Figure 8:
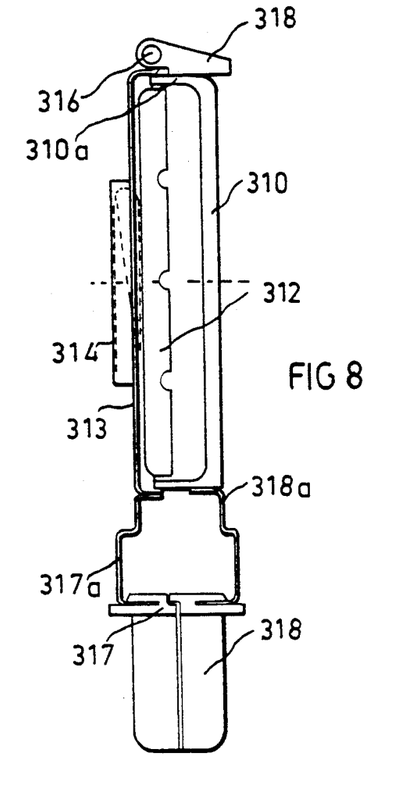
FIG. 8 is a top plan view of the food holder of FIG. 7.

The construction of the food holder 308, and particularly the two food holder plates 310, 312, is best seen in FIGS. 7 and 8.

Thus, as shown in these figures, food holder plate 310 is a solid plate of metal, such as aluminum, of rectangular configuration formed with a flange 310a around its periphery Plate 312 is also a solid metal plate but it is mounted to a metal rectangular frame 313 by a pair of leaf springs 314, 315 at the opposite sides of plate 312. Thus, the outer end of each leaf spring 314, 315 is secured to the frame 313 and the inner end of each leaf spring is secured to the metal plate 312, so that the metal plate is springly mounted by the leaf springs towards metal plate 310. Frame 313 is pivotally mounted to plate 310 by a hinge 316.

Each of the two food holder plates 310, 312, further includes a thermally insulated handle 317, 318, joined to plate 310 and frame 313 by extensions 318a and 317a, respectively, and enabling the food holder to be inserted into and removed from housing 302 via opening 306.

Housing 302 further includes a liquid drippings collector 336 (FIG. 5) underlying the food holder 308 to catch any drippings from the food article during its grilling. Collector 336 is removable via an opening in the end wall of the housing.

The illustrated appliance further includes a timer control knob 340 having a plurality of graduation markings 342 (FIG. 5) viewable via slot 344 formed in the housing 302. Knob 340 thus controls the setting of the timer switch $MS_4$ (FIG. 9), which in turn controls the energization of the heater lamps as well as the operation of the motor M.

The metal plates 310 and 312 and frame 313 of the food holder 308 are of aluminum which has been hard anodized on both faces. Such hard anodized aluminum forms a blackened layer on the outer faces which efficiently absorbs the infrared radiation emitted by the four heater lamps, and also forms a non-stick layer on the inner faces which prevents the food article from sticking thereto. The metal plates should be sufficiently thick, preferably at least 2.5 mm, e.g., 3.00 mm, to smoothen out fluctuations in the heat received from the infrared heaters by the cylical switching thereof, as described above with respect to FIG. 9.

The space 346 between the reflector 324 and the housing 302 is cooled by air circulated therethrough via inlet openings 348 formed in the housing bottom wall 350 and an outlet opening 352 through the top wall of the housing. Thus, even though the halogen lamps generate intense heat, reflectors 324 and the air-cooled spaces 346 between it and the housing, enable the housing to be made of a plastics material.

The operation and manner of using the illustrated grilling appliance will be apparent from the above description. Thus, the food to be grilled is inserted between the two metal plates 310, 312 of the food holder 308, and the food holder is then inserted via elongated opening 306 into the housing 302. Leaf springs 314, 315 press metal plate 312 firmly against the food article and the food article against metal plate 310 of the food holder. After the food holder with the food article therein has been thus inserted into the housing 302, the timer controller knob 340 is set to select the grilling time.

The setting of the timer control knob 340 energizes the four halogen lamps and also the motor M. The motor actuates the switches $MS_1$-$MS_3$ to cyclically switch the four lamps, such that during a first part of the cycle the upper pair of lamps are connected in series and the lower pair are connected in parallel, and during the second part of the cycle the upper pair of lamps are connected in parallel and the lower pair are connected in series. The heat radiated by the lamps is absorbed by the blackened surfaces on the metal food holder plates 310, 312 and is immediately converted into heat. This heat is transmitted by conduction through the food holder plates directly to the food article to quickly grill it.

The grilling appliance illustrated in the drawings thus provides all the advantages of those described in FIGS. 1-3, with the further advantage that it permits a quick grilling of the food article without unduly overloading the power supply line.

Figure 10:
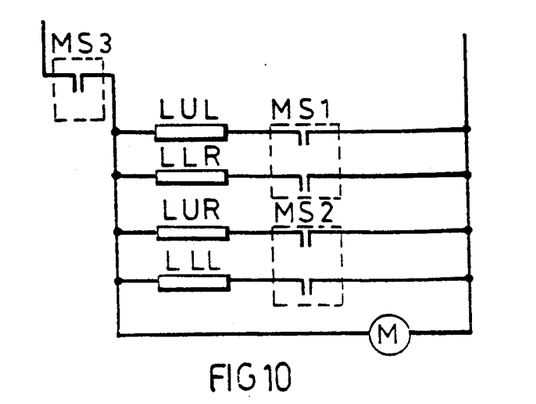

The Modification of FIG. 10

FIG. 10 illustrates a modification in the circuit of FIG. 9, wherein the switches $MS_1$-$MS_3$ are cyclically controlled by the motor such that during a first part of the cycle the upper pair of lamps are disconnected from the power supply and the lower pair of lamps are connected in parallel; and during the second part of the cycle the upper pair of lamps are connected in parallel and the lower pair of lamps are disconnected from the power supply. Such an arrangement requires even less power and has been found to maintain a relatively high temperature in the metal food holder plates 310, 312 sufficient to quickly grill the food article heated by conduction from the food holder plates.

While the invention has been described with respect to several preferred embodiments, it will be appreciated that many other variations, modifications and applications of the invention may be made.

What is claimed is:

1. An electric grilling appliance, comprising: a housing; a pair of infrared radiation emitting heaters disposed within the housing on opposite sides thereof; a food holder disposed within the housing between and spaced from said pair of infrared radiation emitting heaters for holding the food article to be grilled; said food holder including a pair of metal food holder plates of a size and configuration to directly contact, on their inner surfaces, substantially the complete outer surface of the food article to be grilled, the outer surfaces of said metal food holder plates being blackened to absorb the infrared radiation emitted by said heaters; and spring means for urging said metal food holder plates towards each other into firm contact with the food article to be grilled.

2. The appliance according to claim 1, wherein said housing includes reflector plates extending along the outer sides of said infrared radiation emitting heaters, opposite to those facing the food holder, for reflecting the emitted radiation substantially uniformly over said blackened outer surfaces of the metal food holder plates.

3. The appliance according to claim 1, wherein said infrared radiation emitting heaters are halogen lamps.

4. The appliance according to claim 1, further including a liquid drippings collector underlying said pair of metal food holder plates.

5. The appliance according to claim 1, wherein there are two pairs of infrared radiation emitting heaters, including a first pair on opposite sides of the housing and a second pair on opposite sides of the housing; said appliance further including cyclical switching means effective, during a first part of each cycle, to connect the heaters of the first pair in parallel with respect to a power supply, and during a second part of each cycle, to connect the heaters of the second pair in parallel with respect to the power supply.

6. The appliance according to claim 5, wherein said cyclical switching means is effective, during said first part of each cycle to connect said second pair of heaters in series with respect to the power supply, and during said second part of the cycle, to connect said first pair of heaters in series with respect to the power supply.

7. The appliance according to claim 5, wherein said cyclical switching means is effective, during said first part of each cycle to disconnect said second pair of heaters from the power supply, and during said second part of the cycle to disconnect said first pair of heaters from the power supply.

8. The appliance according to claim 1, wherein said metal food holder plates are sufficiently thick to smoothen out fluctuations in the heat received thereby from the infrared heaters by the cyclical switching thereof.

9. The appliance according to claim 1, wherein one of said metal food holder plates is mounted to a metal frame by means of a pair of metal leaf springs whose opposite ends are secured to the plate and the frame, respectively, said metal frame being hingedly mounted at one end to the other of said metal food holder plates.

* * * * *